US009038441B2

(12) United States Patent
Downing

(10) Patent No.: US 9,038,441 B2
(45) Date of Patent: May 26, 2015

(54) HIGH SPEED HELIUM LEAK DETECTION SYSTEM AND METHOD

(71) Applicant: Harry L. Downing, Port Townsend, WA (US)

(72) Inventor: Harry L. Downing, Port Townsend, WA (US)

(73) Assignee: TLI Enterprises, Inc., Hayward, CA (US)

( * ) Notice: Subject to any disclaimer, the term of this patent is extended or adjusted under 35 U.S.C. 154(b) by 353 days.

(21) Appl. No.: 13/740,971

(22) Filed: Jan. 14, 2013

(65) Prior Publication Data
US 2013/0186180 A1 Jul. 25, 2013

Related U.S. Application Data

(60) Provisional application No. 61/588,995, filed on Jan. 20, 2012.

(51) Int. Cl.
G01M 3/20 (2006.01)
G01M 3/22 (2006.01)

(52) U.S. Cl.
CPC .............. G01M 3/20 (2013.01); G01M 3/226 (2013.01)

(58) Field of Classification Search
CPC ....... G01M 3/20; G01M 3/202; G01M 3/226; G01M 3/3281
See application file for complete search history.

(56) References Cited

U.S. PATENT DOCUMENTS

| 4,515,751 | A | * | 5/1985 | Krieg, Jr. | 422/86 |
| 4,847,602 | A | * | 7/1989 | Altland et al. | 361/679.21 |
| 4,894,748 | A | * | 1/1990 | Shefet | 361/679.46 |
| 5,341,671 | A | * | 8/1994 | Baret et al. | 73/40.7 |
| 5,821,404 | A | * | 10/1998 | Bohm et al. | 73/40.7 |
| 5,988,206 | A | | 11/1999 | Bare et al. | |
| 6,119,715 | A | | 9/2000 | Russell | |
| 2005/0199042 | A1 | * | 9/2005 | Perkins et al. | 73/40.7 |
| 2010/0095745 | A1 | * | 4/2010 | Flynn et al. | 73/40.7 |
| 2011/0283769 | A1 | * | 11/2011 | Bohn et al. | 73/23.2 |
| 2012/0261569 | A1 | * | 10/2012 | Grosse Bley et al. | 250/282 |

FOREIGN PATENT DOCUMENTS

| DE | WO2010094582 A1 | 8/2010 | |
| WO | WO 2006083400 A2 | * | 8/2006 | G01M 3/22 |

OTHER PUBLICATIONS

NFPA 496 Standard for Purged and Pressurized Enclosures for Electrical Equipment 2003 Edition. National Fire Protection Association. 2003. <(URL: http://www.scribd.com/doc/120628188/NFPA-496-2003#download>.

* cited by examiner

Primary Examiner — David A Rogers
(74) Attorney, Agent, or Firm — Innovation Law Group, Ltd.; Jacques M. Dulin, Esq.

(57) ABSTRACT

Improved high speed helium leak-detection system for storage tanks comprising a mobile enclosure for operation of electrical components of leak detection sensors in Class 1, Division 1, Group D hazardous locations, comprising a rapid exchange purge assembly having pressure control valves, pressure reference controller and vent, a mechanically actuated vortex-type cooler, a helium leak detector having a pumping manifold connected to a sniffer probe hose to provide sample gas from the tank probe to a pair of pumps oriented in parallel. The first pump, downstream of the helium leak detector, draws a sample through the detector, and a second pump provides a rapid transfer of probe sample. The enclosure includes a controller, display and alarm. The enclosure is maintained overpressure to prevent infiltration of hazardous vapors and is continuously purged with com-pressed air. The system provides response time of about 2 seconds, a 5-fold improvement over current systems.

20 Claims, 5 Drawing Sheets

FIG. 1  High Speed Helium Leak Detection System For Hazardous Environments

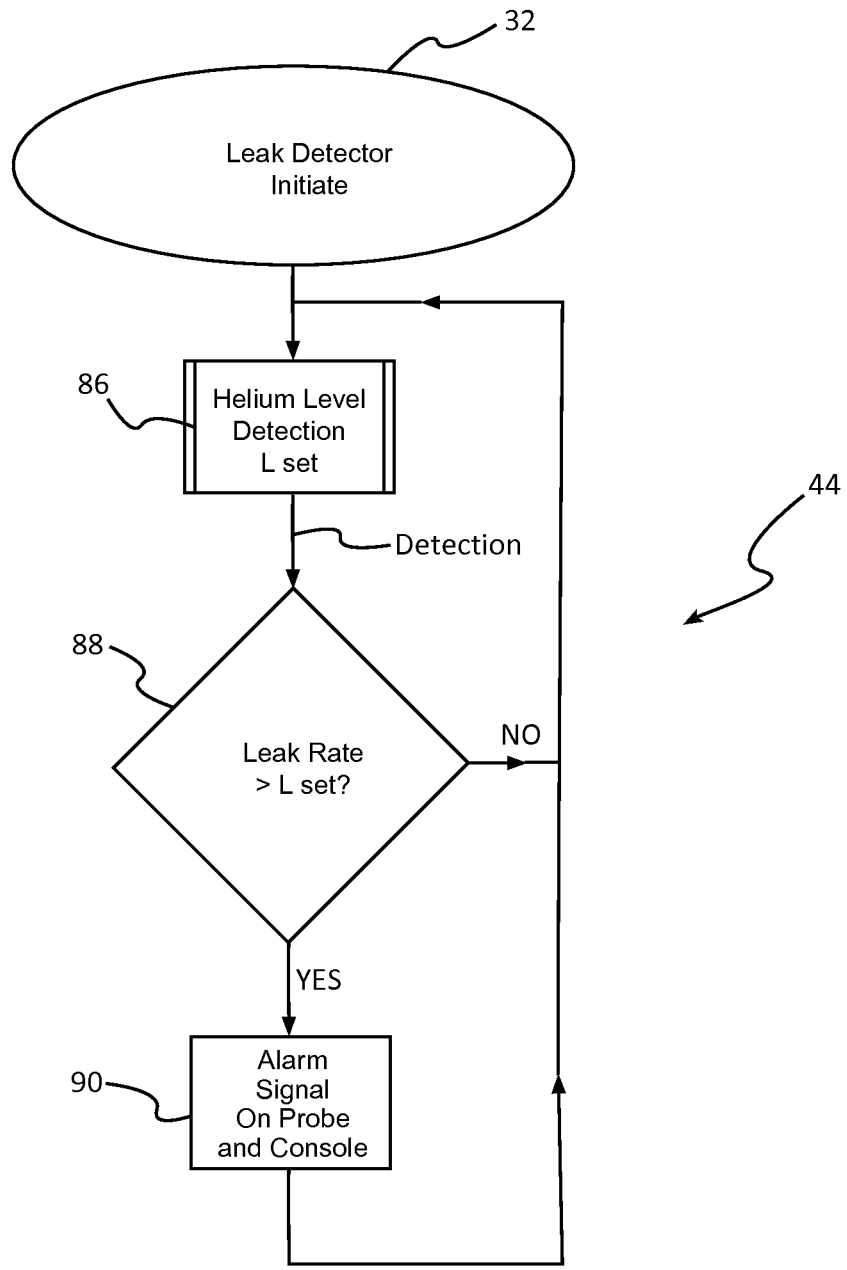

HIGH SPEED HELIUM LEAK DETECTION SYSTEM AND METHOD

CROSS REFERENCE TO RELATED APPLICATION

This is the Regular US Application corresponding to and claiming priority from U.S. Provisional Application of the same title, Ser. No. 61/588,995, filed by the same inventor on Jan. 20, 2012, the disclosure of which is incorporated by reference and the priority of which is claimed under 35 USC §119 ff.

FIELD

The invention is related to the field of helium leak detection, and more particularly to an improved, special purpose, high speed helium leak detection system for detection of helium tracer leaks from helium/air pressurized vessels, including fuel storage tanks that are located in hazardous environments. The exterior of each vessel/tank is sniffed with a negative pressure probe that draws in ambient air plus a sample of trace helium leaking out of the tank. The probe sample is evaluated by means of a helium-sensitive sensor which converts the sensor signal into quantitative leak rates. The sniffer probe opening is at the outboard end of a long line, and the response time to get the inlet sniffed gas to the sensor is reduced to less than 2 seconds (<2 sec) by a secondary pumping system. The pumps, electrical supply components and leak detector are enclosed in a hazardous location enclosure that includes both a rapid exchange purge system and an enclosure cooling system. The inventive system includes a system display and a controller having configuration and alarm functionality.

BACKGROUND

Storage vessels, and particularly aircraft fuel tanks, must be free of leaks, even microscopic ones, to insure their integrity for operation under harsh environments. In order to test the integrity of vessels/tanks alter manufacture, or after use once put in service, leak detection systems are used. Typically these have a long hose attached to a vacuum pump to pull in a sample of gas and air. The hose terminates in a defined-size metal tube terminating in a sniffer probe that functions as an inlet nozzle. The vessel/tank to be tested is pressurized with a selected mix of air and helium. Then the sniffer probe is guided over all surfaces and outlet valves and lines of the tank to draw in samples of gas, in the ease of a sound tank, having no leaks, ambient air, but in the ease of a leaking tank, helium-laden air.

The probe sample is routed to a helium sensor which detects the helium and can convert the detection signal into a quantitative rate of leak. These helium sensors are relatively conventional, one type working by ionizing a gas sample containing helium, passing the ionized sample through a magnetic field and collecting the helium ions as they emerge to produce an electric current which is used to drive an ammeter the values of which are converted to quantitative leak rates. Another system rises a membrane, which allows only Helium to pass through for detection.

A serious problem is presented by currently available helium leak detections systems in that the hose line from the sensor to the probe tip is required to be on the order of 10-50 feet in length to permit the detection technician to climb up on aircraft wings to reach tanks that are in service. A typical response time for a 10 foot snifter hose is around 10 seconds, since it takes that long for a sniffed sample to be delivered to the helium sensor. By that time the technician may have moved on to a different area of the tank, so that an alarm means that the technician must return to a previous area in order to pin-point the leak location.

In addition, many tanks under test are located in hazardous environments, such as Class 1, Division 1, Group D hazardous environments, such as those involving volatile organic fuels or solvents. Accordingly, the electrical equipment associated with the probe pump, sensor, control system and alarm system cannot be used in such environments. In order to service in such environments, present systems require even longer hoses, or sequestration of the pump, sensor and associated electrical systems in separate rooms.

Accordingly, there is a significant, unmet need to have a faster response time in helium leak detection so that retracing a sampling path is not required, and permits operating, portably, in hazardous environments.

THE INVENTION

Summary, Including Objects and Advantages

The invention is directed to an improved, special purpose, high speed helium leak detection system for detection of helium tracer gas leaks trout storage vessels, such as fuel tanks, located in hazardous environments. The inventive system comprises a special purged air enclosure (also called a cabinet) that permits use of all electrical components associated with leak detection sensors to be operated in Class 1, Division 1, Group D hazardous location environments. The enclosure is mourned on wheels for mobility. The enclosure includes an enclosure protection rapid exchange purge assembly with pressure control valves, pressure reference controller and an enclosure protection vent, a cabinet cooler, preferably a vortex-type cooler, that is thermally actuated mechanically rather than electrically, a helium leak detection system having a pumping manifold, the inlet of which is connected to the outlet end of the sniffer probe hose. The pumping manifold provides the sample gas from the vessel/tank probe to a pair of pumps oriented in parallel, in which a first pump is disposed downstream of the helium leak detector sensors to draw sample through the detector, and a second pump provides a rapid transfer boost of the sample from the probe nozzle. The enclosure/cabinet also includes an internally mounted controller having an input keyboard for configuring the operation, a display, and an alarm. The enclosure is maintained at a selected overpressure relative to the ambient environment to prevent infiltration of hazardous vapors. The enclosure overpressure is provided by facility compressed air, which is typically dry, filtered fresh air. In the alternative, an inert gas, not helium, may be used to provide the enclosure purge gas.

In operation, the storage vessels or tanks to be tested for leaks are filled with an overpressure of a mixture of helium and air. The exterior of each tank is sniffed with a negative pressure probe drat draws in a sample of ambient air that would include traces of helium leaking out of the tank. The probe sample is evaluated by means of a helium-sensitive sensor which converts the sensor signal into quantitative leak rates. The sniffer probe opening is at the outboard end of a long hose line, approximately 60 feet in length. In the inventive system, the response time to get the inlet sniffed gas to the sensor is reduced to less than 2 seconds by the parallel secondary pumping system. This is a 5 or more-fold reduction in response time, permitting near real time sensing, as the residence of a probe in any one location on a tank has a dwell time on the same order, e.g. 2-3 seconds.

In terms of operation of the inventive high speed He detection method, the following steps occur:

1. The minimum acceptable pressure within the enclosure is 0.15" c.w. If the pressure falls below this value, then the power is shut down and the Rapid Exchange Sequence is initiated. Air at 80 psig is switched on and introduced into the cabinet.
2. Once the internal enclosure pressure reaches 2.5" c.w. the timer of the Rapid Exchange Sequence starts. The sequence lasts for 15 minutes and results in approximately 4 cabinet volume exchanges.
3. During the Rapid Exchange Sequence the pressure within the enclosure can rise up to approximately 4.5" c.w. The Enclosure Protection Valve (EPV) is designed to open at 0.65" c.w. in order to protect the enclosure from overpressure and allow for the exchange of the air volume. So, during most of the Rapid Exchange Sequence the EPV is open and air from the enclosure is forced to escape, thus allowing for a purging of the enclosure and the 4× volume change.
4. After the Rapid Exchange Sequence is completed (i.e. after 15 min) the pressure inside the enclosure is allowed to drop down to 1.5" c.w. This value is set by the operator via the Enclosure Pressure Control Valve. The electrical power is restored.
5. In NORMAL operation the Purge system will maintain the pressure within the enclosure at 1.5" c.w. and maintain the electrical power. If the enclosure pressure were to fall below 0.15" c.w. then the whole process would be repeated.

The wheeled hazardous location qualified enclosure of the invention permits bringing the leak detection sensor system in close proximity to the location of the vessels, which may be tanks on a large aircraft, or in other hard-to-access locations.

BRIEF DESCRIPTION OF THE DRAWINGS

The invention is described in more detail with reference to the drawings, in which:

FIG. 5 is a block diagram of the operation of the leak detector sub-system of the inventive enclosure.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. For clarity said conciseness, several of the drawings show in schematic, or omit, parts that are not essential in that drawing to a description of a particular feature, aspect or principle of the invention being disclosed. Thus, the best mode embodiment of one feature may be shown in one drawing, and the best mode of another feature will be called out in another drawing.

All publications, patents and applications cited in this specification are herein incorporated by reference as if each individual publication, patent or application had been expressly stated to be incorporated by reference.

Figure 1:
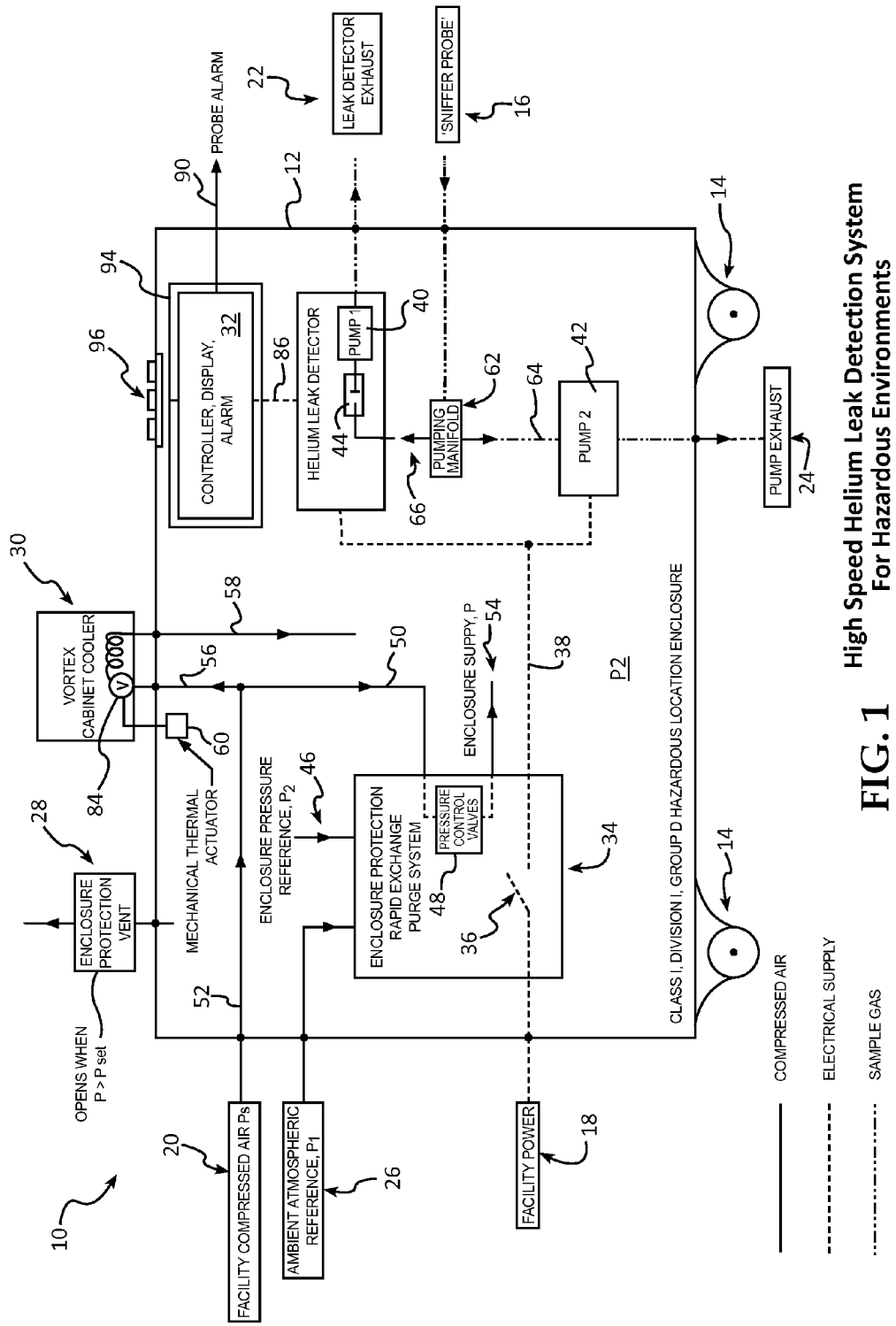
FIG. 1 is a schematic of the system architecture of the inventive rapid response helium leak detection system as installed in a wheeled Class 1, Division 1, Group D Hazardous Location Enclosure.

FIG. 1 shows an exemplary embodiment of the overall system architecture of the inventive rapid response helium leak detection system 10 as installed in a Class 1, Division 1, Group D Hazardous Location Enclosure 12 having wheels 14 for mobility. The enclosure 12 is preferably a sealed stainless steel box sized at approximately 15 cu ft; suitable access doors (not shown) are provided for installation and service repair of the interior sub-systems. All apertures are sealed, including the vias for sniffer probe hose input 16, facility power line 18, facility compressed air inlet line 20, leak detector exhaust line 22 and boost pump #2 exhaust line 24. Also sealed are an ambient atmospheric pressure reference device 26, an enclosure overpressure protection vent line 28, the several lines to and from the vortex cabinet cooler 30 and a controller 32, which is accessible from the outside and which communicates with the leak detector 44. The control panel includes an input interface, display and visual and audible alarm, preferably an alarm at the probe handle 90, and/or on the cabinet. The controller 32 includes a display, preferably integrated, and visible through a sealed window 94 in the side wall or top wall of the cabinet. In the embodiment wherein the controller and display are internal to the cabinet, the system may include an externally accessible control panel, such as button switch unit 96, that is sealed into the top or side wall of the cabinet as illustrated in FIG. 1. The control system may also include wireless link to a facility LAN system so that at any time, data from in-progress testing of tanks can be observed and archived in system memory.

Internal of the sealed cabinet are a number of sub-systems, including an enclosure protection and rapid exchange purge system 34, which regulates and monitors pressure of the sealed enclosure 12 and rapidly removes and prevents flammable vapor accumulation within the enclosure. The protection and rapid exchange purge system 34 comprises a pressure differential-actuated line cut-off switch 36 in the incoming power line 18. The switch 36 outs off power 38 to the pumps 40 and 42 and to the helium leak detector unit 44 itself, in the event that the pressure inside the cabinet 12 falls below a preset minimum, by way of example, 0.15" c.w. within the cabinet. This power-shut-off provides protection against spark ignition of vapors that may enter the cabinet in hazardous environments. The purge unit may also be visible through a sealed window in the side wall of the cabinet (not shown).

In addition, the rapid exchange purge system regulates the pressure in the enclosure 12 as follows: A sensed reference 26 to the pressure in the ambient environment in which the mobile enclosure is located, e.g., a fueling depot area, is compared to the internal pressure reference inside the enclosure 46. The differential of these pressures determines the state of the pressure control valve 48 that is in one branch 50 of compressed air teed line 52 inlet from facility compressed air 20. When the pressure differential is below 0.15" c.w., as in the above example, the Rapid (Air) Exchange Sequence is initiated, with valve 48 opening to provide compressed air, for example, supplied at 80 psig, via outlet 54 into the interior of the enclosure, thus maintaining the overpressure in the cabinet to prevent infiltration of ambient hazardous vapors. When the internal pressure P exceeds a preset value, approximately 0.65" c.w., the Enclosure Protection Vent 28 automatically opens and the air in the enclosure begins to be exchanged out as compressed air is inlet via valve 48. Vent 28 is also a spark arrester type vent.

The compressed air is supplied faster than the vent 28 can release enclosure air, so the internal enclosure pressure continues to rise. Once the internal enclosure pressure reaches 2.5" c.w., the timer of the Rapid Exchange Sequence starts. The exchange period is typically set at 15 minutes, during which approximately 4 enclosure volumes are exchanged out. Thus, during the RES the pressure within the enclosure can rise to approximately 4.5" c.w., during which the EPV is open, allowing for a purging of the enclosure with the 4× volume change of fresh air.

After the RES time period ends, the compressed air inlet valve 48 closes, the EPV stays open until the pressure in the enclosure drops to 1.5" c.w. This value for closure of the EPV is set by the operator via the Enclosure Pressure Control valve. At that point the electrical power to the system is restored by closure of switch 36. Normal operation continues with the Purge system maintaining the pressure P2 within the enclosure 12 at 1.5" c.w. and the power ON. If the enclosure pressure were to fall below 0.15" c.w. the whole repressurization/purge cycle is repeated.

In addition, the input compressed air provides a cooling function by a purely mechanical system, comprising the compressed air 52 feeding a second branch 56 into the vortex cooler 30. The cooled portion of the compressed air is fed back into the cabinet via line 58. Of course, cooler air inlet via line 58 contributes to the internal pressure, such that the valve in the vent 28 may open relatively simultaneously, providing rapid venting and continuous supply of clean dry cooled air into the cabinet. The vortex cooler is actuated by a mechanical thermal actuator 60 which opens a valve in line 56 permitting the compressed air to flow through the vortex cooler 30. The warm exhaust stream from the cooler is not shown, but it exhausts to ambient, that is outside of the cabinet.

Pumps 1 and 2 are powered by line 38, and are in parallel with a manifold 62 that splits the incoming gas sample from the sniffer probe 16. The pump #2 provides a booster draw which brings a large volume of sample gas into the manifold within the enclosure which is exhausted out the exhaust line 24. A portion of the gas sample is diverted to the leak detector 44 at a rate at which it can handle, and that portion of sample gas is drawn through the leak detector by pump #1 and then exhausted to the exterior via exhaust 22. Since the sample gas is uniform, the ppm of He in the main stream 64 is the same as in the detector stream 66. Thus, the process of the invention comprises the step of sampling only a portion of the entire sniffer input stream, which can be transported faster to the detector by increasing fluid (gas) flow through the use of a larger capacity booster pump.

Figure 2:
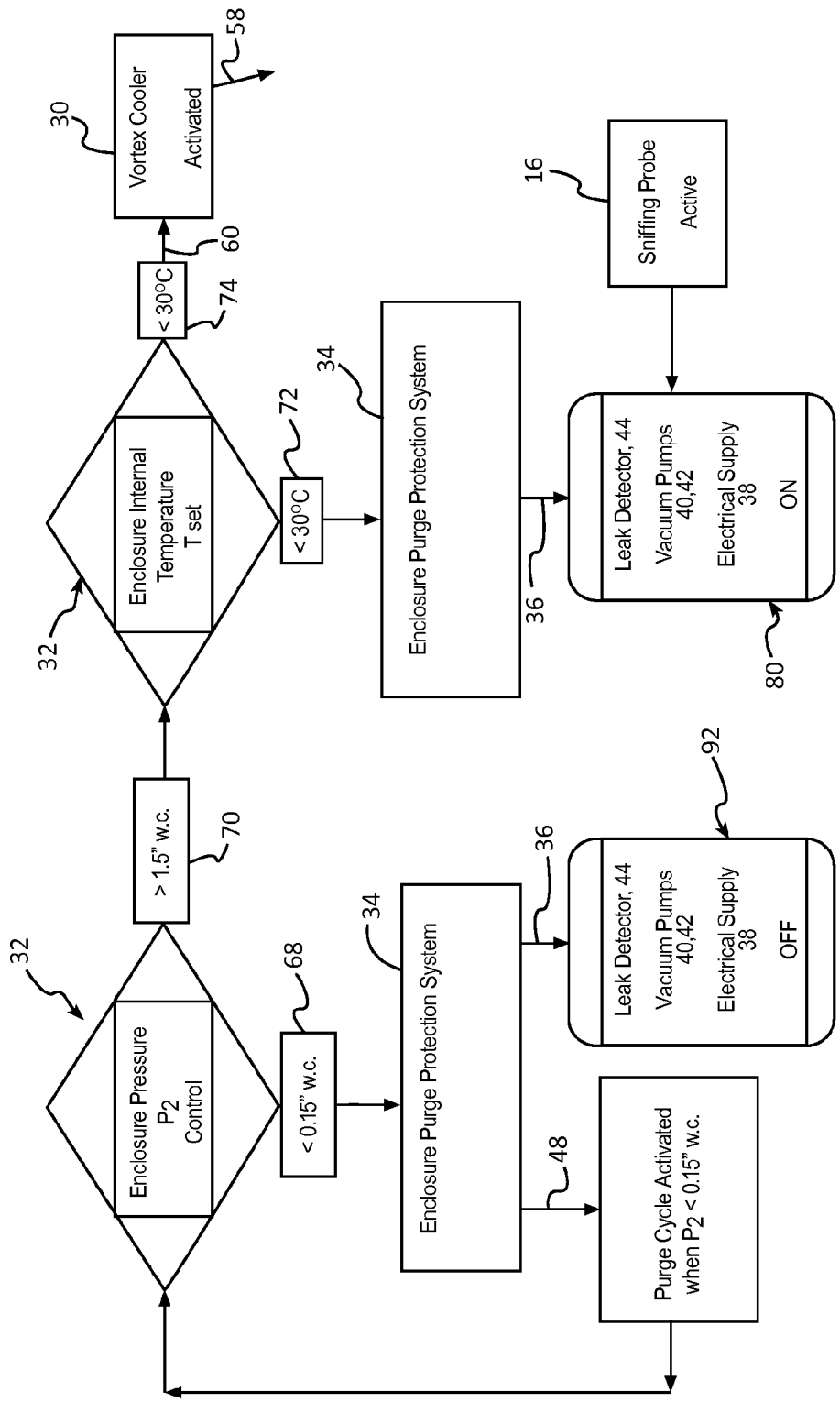
FIG. 2 is a block diagram of the operation of the inventive rapid response helium leak detection system pressure and temperature control system of FIG. 1.

FIG. 2 shows, in block diagram form, the operation of the inventive rapid response helium leak detection system pressure and temperature control system of FIG. 1, so FIG. 2 should be read together with FIG. 1. The left side of the diagram shows the operation of the purge control system while the right half of the diagram shows normal operation and cooling when temperature goes over its set point. Referring the left half of the diagram, the enclosure pressure set point range is entered in controller 32, with the low set point at 0.15" c.w., and the high set point at 1.5" c.w. as the selected operational range. Where the pressure falls below 0.15" c.w., at condition 68, as sensed by the differential between ambient 26 and internal 46, the purge protection system 34 is triggered to open power line switch 36 to the OFF mode, 92, cutting off power 38 to the leak detector 44 and the vacuum pumps 40, 42. At the same time the purge cycle is activated by opening valve 48 to provide additional compressed air 54 into the enclosure to repressurize the enclosure. When the purge cycle is finished and the enclosure internal pressure is restored to 1.5" c.w., Normal operation mode is resumed, and the power is switched to the ON mode, 80, by the closing of switch 36. When the compressed air valve 48 is opened, and the Cabinet pressure, P2, exceeds approximately 0.65" c.w., the vent 28 opens permitting purge air exchange.

Where the 26, 46 pressure differential condition 70 is now above the low set point of 0.15" c.w. and below the high set point of 1.5" c.w., the system is operating normally, the enclosure purge protection 34 closes switch 36 and power 38 is provided to the leak detector 44 and the two vacuum pumps 40, 42 to draw gas sample through sniffing probe 16. Where the temperature is sensed in the cabinet by temperature sensor T, see FIG. 1, as above the set point 30° C., condition 74, the vortex cooler 30 is activated by thermal actuator 60 to provide cooling air 58 into the enclosure.

Figure 3:
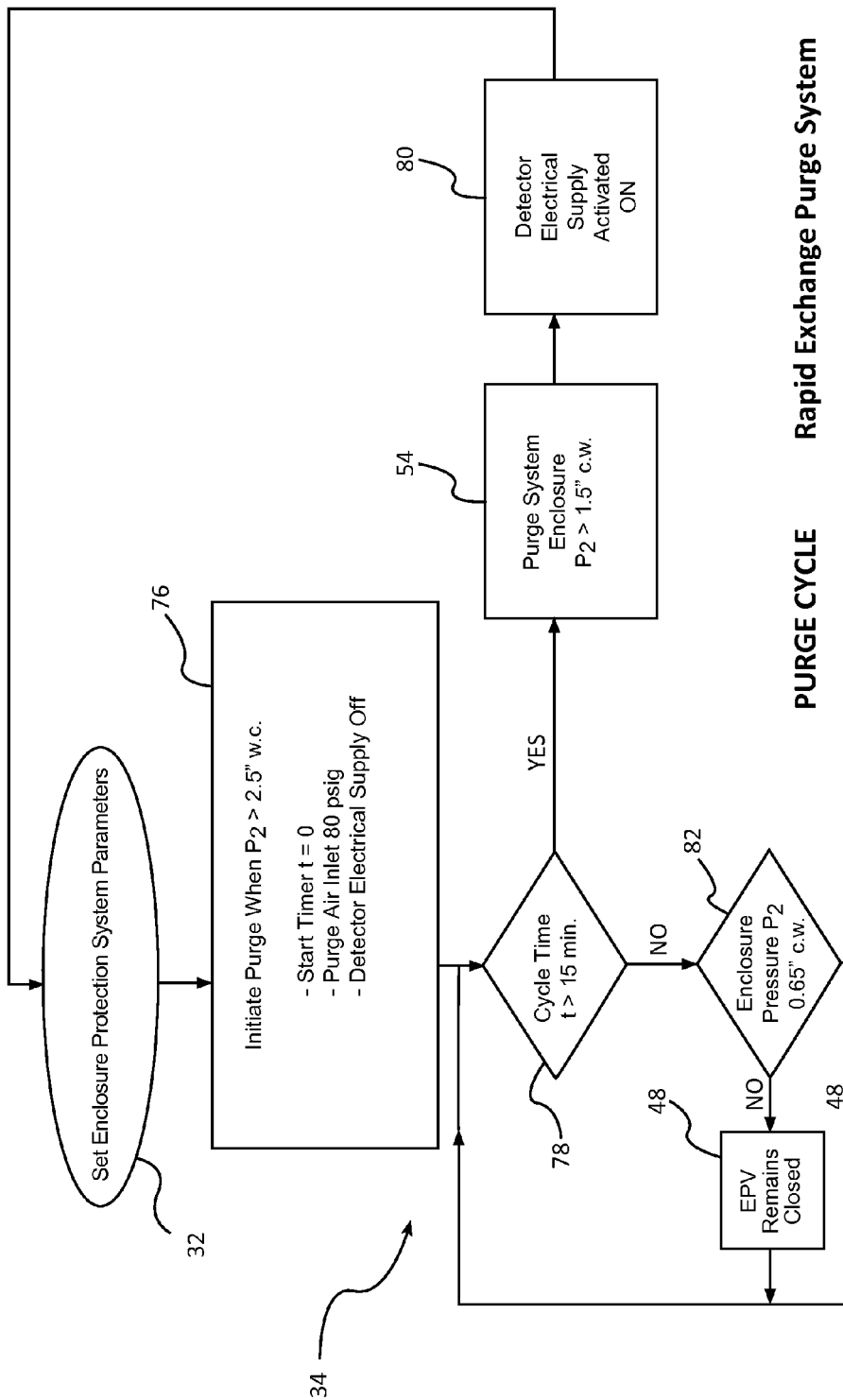
FIG. 3 is a block diagram of the operation of the purge cycle of the inventive enclosure purge system sub-assembly.
Figure 4:
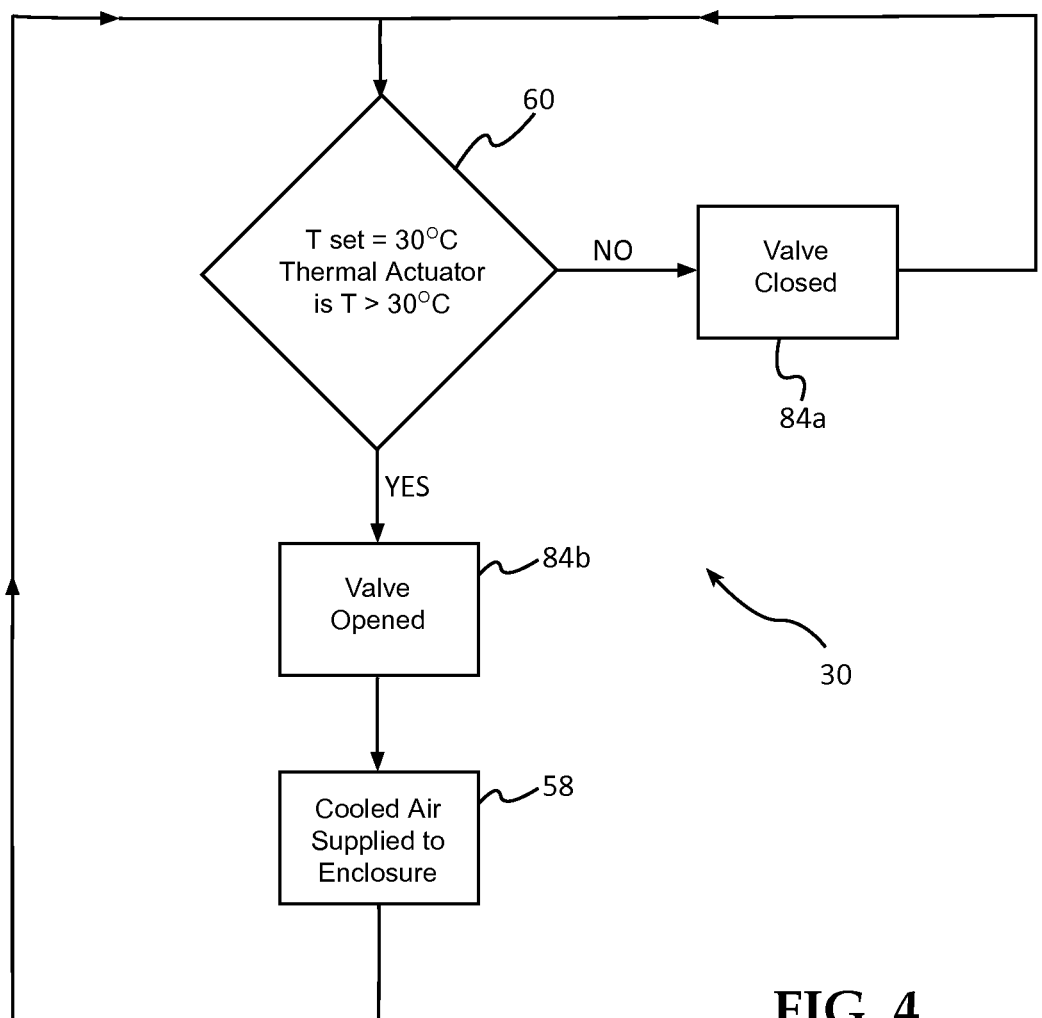
FIG. 4 is a block diagram of the operation of the vortex cooler sub-system of the inventive enclosure.

This system operation as set forth in FIGS. 1 and 2 is further described by way of an implementation example in the three related FIGS. 3-5, in which FIG. 3 is a block diagram of the operation of the purge cycle of the inventive enclosure purge system sub-assembly, FIG. 4 is a block diagram of the operation of the vortex cooler sub-system of the inventive enclosure and FIG. 5 is a block diagram of the operation of the leak detector sub-system of the inventive enclosure. In this example of operation, the following parameters are established:

P1 is the ambient atmospheric pressure;
P2 is the internal enclosure pressure;
Ps is the facility compressed air supply pressure in #/sq. in. (PSIG);
Pset is the exhaust purge valve 28 threshold pressure for opening;
P is the rapid exchange purge assembly 34 output pressure into enclosure 12; and
Tset is the vortex cooler 30 set point of thermal actuator 60 in ° C.

In this example, as shown in FIG. 3, the following settings are entered into the controller 32:

Ps=80-100 PSIG;
Tset=30+ C.;
Pset=0.65" c.w.; and
Purge cycle time=15 minutes.

In normal operation, the rapid exchange purge unit 34 automatically maintains the enclosure at the following conditions:

P2=1.5" c.w.;
and the purge cycle is initiated if the pressure falls such that:
P2<0.15" c.w.

When the pressure falls below the minimum the purge cycle is initiated for a period of 15 minutes.

As shown in FIG. 3 upon initiation of the purge cycle 76, the timer is started at t=0, the output pressure from the facility compressed air supply into the enclosure is supplied by opening valve 48 at a delivery pressure of Ps=80 psig and the detector 44 and pumps 40, 42 are shut off by cut off of the electrical supply 38 by opening switch 36. The cycle timer counts up at 78. If t>15 minutes, the YES branch is followed, and if the pressure in the enclosure, P2=1.5" c.w., the electrical supply is activated ON, 80, by closure of switch 36. If t<15 minutes, the NO branch is followed, the purge input of air via valve 48 and supply 20, 50 continues with the pressure in the enclosure P2 being monitored at 82 through the reference sensors 26, 46. Where the pressure in the enclosure, P2>0.65" c.w., the YES branch is followed, the exhaust pressure valve (EPV) 28 automatically opens, and the fresh dry compressed purge air continues to be supplied via valve 48, the net result being to clear the enclosure through the remainder of the purge cycle. Where the pressure in the enclosure remains <0.65" c.w., the NO branch is followed, the exhaust pressure valve 48 remains closed, and the compressed air P, 54, continues to be supplied via 20, 50, 48 as the cycle continues.

FIG. 4 shows the operation of the vortex cooler 30. The thermal actuator 60 is set to activate at Tset>30° C. So long as the temperature in the enclosure remains below Tset, the valve 84 (see FIG. 1) remains closed 84*a* as shown by the NO branch of FIG. 4. Where the temperature exceeds Tset, the YES branch of the diagram is followed, the valve 84 is opened, 84*b*, and cooled air 58 is supplied to the interior of the enclosure 12. Note that both the purge operation of FIG. 3 and the cooling of FIG. 4 can operate at the same time. That is, if the temperature in the enclosure rises beyond Tset, the cooling commences. If this results in overpressure P2>0.65" c.w., the EPV 28 opens and the hot air in the enclosure interior is flushed. If during that cooling event, the purge cycle is initiated, there can be two sources of fresh dry facility air provided, through both the vortex cooler 58 and through the rapid exchange purge system 34, 54.

FIG. 5 shows schematically the operation of the helium leak detection system 44. The leak detector operation is initiated at the control panel 32 with the Pass/Fail detection level, Lset, being preset at 86. The detector 44 is put into operation by powering the detector and pumps 40 and 42 to draw sample from the probe 16. The sample stream is split by the manifold 62, and the minor detection portion is inductively drawn through the detector 44 by vacuum, pump #1, 40. The detector reports the He values detected 88 to the controller 32. Where the Lset value is not exceeded, the NO branch, the probe sniffing may continue. Where the Lset is exceeded, the YES branch, an alarm signal 90 is sent to the probe so the operator may mark the location of the leak on the tank being sniffed.

In accord with the inventive principles described and shown herein, an improved He leak detector takes in a sample of gases through a approximately 60' of sniffing line, detects the trace amount of helium in the sample by means of a helium sensitive sensor, and converts the sensor signal to quantitative leak rates. To provide high speed transport of sample from the induction sniffer probe, which is being passed over the surface of a tank over-pressured with a test mixture of helium and air, a second, booster vacuum pump is provided in parallel to the detector vacuum pump (which is located downstream of the detector). This provides a draw greater than can be handled by the detector, but results in rapid transport of a sample stream to the detector enclosure, where a manifold splits it into two streams, a small detector sample portion suitable in volumetric rate tor the detector, and a major portion that is exhausted exterior of the enclosure without passing through the detector.

The system also houses the detector and pumps within a sealed, fresh air-purged enclosure that permits the use of the electrical components of the detection system in Class 1, Division 1, Group D Hazardous Environments. The rapid exchange purging system operates on a supply of fresh, dry compressed air provided by the facility where the tanks are being tested for leaks. The purging system regulates and monitors pressure of the sealed enclosure relative to the ambient environment, and prevents flammable vapor accumulation within the enclosure. During a purge cycle, the system rapidly removes 4 or more air exchanges and maintains a positive pressure in the enclosure to prevent infiltration of vapors. The purge system includes an electrical power controller that monitors the purging operation and controls enclosure power to all internal electrical components.

The system also may include a vortex-type cooler to cool the air in the enclosure when located in a hazardous environment, using only the fresh compressed air supply to generate the cooling. The vortex cooling system is entirely mechanical that requires no electrical components. The cooling air produced by the vortex cooler and supplied to the interior of the enclosure displaces hot air in the enclosure that is vented into the hazardous area outside the enclosure via a spark arrester vent that is mechanically biased normally closed, but will automatically open at a preselected interior pressure.

In its broad aspects, the system of the invention for high speed detection of He leaks from vessels pressurized with He tracer gases comprises: Installed in a Class 1, Division 1, Group D hazardous purged air enclosure that permits use of all electrical components associated with leak detection components and the purge air system is a He tracer gas probe unit having a negative pressure nozzle for sniffing He leaking from He tracer gas-pressurized vessels to provide probe samples; a conduit having a first end connected to an output of said probe unit for conveying said probe samples from sniffed vessels; a pumping manifold system having an inlet connected to a second, distal end of said conduit to receive said probe samples; a detector unit including a He sensor which produces a He detection signal and converts said signal into quantitative leak rates; and said manifold system including a pair of pumps oriented in parallel in which a first pump is disposed downstream of said detector unit to draw a portion of said probe sample into contact with said He sensor, and a second pump providing a negative pressure rapid transfer boost of said probe sample from said probe unit nozzle to said manifold to reduce the transit time from the probe to the He sensor to permit near real time He leak detection.

In its broad aspects, the method of the invention for high speed detection of He leaks from vessels pressurized with He tracer gas in a hazardous environment comprises the steps of: pressurizing a vessel to be tested for leaks with a He-containing tracer gas; sampling selected areas of the exterior of said vessel to be tested with a negative pressure probe to obtain a sample stream volume of gas that may contain He leaking from said test vessel; transferring at high speed said entire volume of said sample stream to a manifold by a first negative pressure device; splitting-off at said manifold a minor portion of said entire sample stream as a detection stream; drawing said detection stream through a He sensor by a second negative pressure device, said He sensor providing a signal upon detection of the presence of trace gas He in said detection stream; and converting in near real time said detection signal into quantitative leak rates of said test vessel, said manifold, sensor and negative pressure devices being disposed in a sealed, purge air enclosure that permits use of all electrical components associated therewith.

It should be clear from the principles of the invention set forth herein, including the examples given, that it will be straightforward for those skilled in the art to adjust the various parameters of the inventive system, such as pressures, set points, time durations and the like, to suit a particular detection application situation for various tank or vessel sizes, types, and service use.

INDUSTRIAL APPLICABILITY

It is clear that the inventive rapid response helium leak detection system of this application has wide applicability to the leak detection industry, and more particularly to the rapid detection of leaks in all types of vessels in hazardous environments, including aircraft fuel tanks, and the like. Since the inventive enclosure is mobile and can operate in Class 1, Division 1, Group D Hazardous Locations, it has the clear potential of becoming adopted as the new standard for apparatus and methods of He leak detection under such conditions.

It should be understood that various modifications within the scope of this invention can be made by one of ordinary skill in the art without departing from the spirit thereof and without undue experimentation. For example, the enclosure configuration can have a wide range of designs to provide the functionalities disclosed herein. Likewise the operation may be controlled and configured to give a wide range of quantitative leak rates before alarms are triggered, and may include archival recording system to record all sensing of a given tank, aircraft or group of tanks. This invention is therefore to be defined by the scope of the appended claims as broadly as the prior art will permit, and in view of the specification if need be, including a full range of current and imam equivalents thereof.

The invention claimed is:

1. A high speed leak detection system for hazardous environment location detection of He tracer gas leaks in vessels, comprising in operative combination:
   a. a mobile Class 1 Hazardous Location Enclosure in which all vias are sealed and all access panels and widows have seals to provide in operation a sealed mobile enclosure;
   b. a He tracer gas probe and having a negative pressure nozzle for sniffing He leaking from He tracer gas-pressurized vessels to provide probe samples;
   c. a conduit having a first end connected to an output of said probe unit for conveying said probe samples from sniffed vessels and having a second, distal conduit end connectable to an input manifold disposed in said sealed mobile enclosure;
   d. a pumping manifold system disposed in said enclosure having an inlet connected to said second, distal end of said conduit to receive said probe samples;
   e. a detector unit disposed in said enclosure including a He sensor which produces a He detection signal and converts said signal into quantitative leak rates;
   f. said manifold system including a pair of pumps oriented in parallel, in which a first pump is disposed downstream of said detector unit to draw a portion of said probe sample into contact with said He sensor, and a second pump providing a negative pressure rapid transfer boost of said probe sample from said probe unit nozzle to said manifold to reduce the transit time from the probe to the He sensor to permit near real time He leak detection; and
   g. said enclosure including an inlet for introduction into said enclosure interior of compressed filtered dry air, or inert gases which exclude He, to provide an internal overpressure in said enclosure to prevent infiltration of hazardous vapors from the location where the enclosure is operating and to permit operation of electrical components for operation of said pumps and He sensor system.

2. A high speed leak detection system for hazardous environment location detection of He tracer gas leaks as in claim 1 wherein said enclosure includes means for maintaining said internal overpressure relative to the ambient environment in which said enclosure is located at a preselected value.

3. A high speed leak detection system for hazardous environment location detection of He tracer gas leaks as in claim 2 wherein said internal overpressure means includes an inlet pressure control valve and a mechanical enclosure valve to vent overpressure above a preselected value.

4. A high speed leak detection system for hazardous environment location detection of He tracer gas leaks as in claim 3 which includes a system for initiation and control of a cycle of rapid exchange of said inlet compressed air or inert gas to purge said enclosure interior with multiple volumes of said compressed air or gas.

5. A high speed leak detection system for hazardous environment location detection of He tracer gas leaks as in claim 4 which includes a mechanically actuated vortex cooler employing said inlet compressed air or inert gas to maintain the internal temperature of said enclosure within a predetermined range.

6. A high speed leak detection system for hazardous environment location detection of He tracer gas leaks as in claim 5 which includes a switch connected to a facility mains power input to said enclosure interior for operation of said leak detection system, said switch is responsive to preselected enclosure internal pressure values in order to cut off power at initiation of said rapid exchange cycle and to automatically restore power when preselected conditions are re-established internal to said enclosure.

7. A high speed leak detection system for hazardous environment location detection of He tracer gas leaks as in claim 4 wherein said rapid exchange system includes ambient atmosphere and enclosure internal pressure reference sensors.

8. A high speed He leak detection system as in claim 6 wherein said enclosure includes a controller, said controller also including a display, control parameter input means and an alarm, said controller linked electrically to said pump manifold system, said internal overpressure means, said rapid exchange purge system and said He leak detection system, said controller being selectively configurable for operation of said leak detection system, including presetting a leak rate detection level for triggering an alarm.

9. A high speed He leak detection system comprising: a sealed, mobile, purged air enclosure permitting operation of electrical components thereof in Class 1, Division 1, Group D Hazardous Locations; said enclosure including a pair of vacuum pumps disposed in parallel drawing a sample stream of gases from a He sniffer probe assembly; a first pump located downstream of a He leak detector in said enclosure that is configured to draw a minor portion of said sample stream through said He detector; and a second pump configured to draw a major portion of said sample stream and exhaust said major portion without sampling directly to the exterior of said enclosure; said dual pump induction of sample stream from said sniffer permitting high speed response of said detector on the order of about 2 seconds for probe sample stream hose line lengths on the order of 60'; and a controller disposed in said enclosure for configuration of operation of said leak detection system including presetting a leak rate level for triggering an alarm at said sniffer probe assembly.

10. A high speed He leak detection system as in claim 9 wherein said sealed mobile enclosure includes a rapid exchange purge system configured to maintain the pressure in said enclosure at a predetermined pressure greater than atmospheric to prevent infiltration of hazardous vapors into said enclosure to permit electrical components of said system to operate in said hazardous locations, a vortex cooler configured to automatically maintain the temperature inside said enclosure at a predetermined temperature, and said controller is configurable to preset enclosure pressure.

11. A method of high speed detection in hazardous environments of He leaks from vessels pressurized with He tracer gas, comprising the steps of:
   a. pressurizing a vessel to be tested for leaks with a He-containing tracer gas;
   b. sampling selected areas of the exterior of said vessel to be tested with a negative pressure probe to obtain a sample stream volume of gas that may contain He leaking from said test vessel;
   c. transferring to a purged air, sealed mobile enclosure said entire volume of said sample stream; said mobile enclosure having disposed therein a manifold connected to a first negative pressure device;
   d. splitting-off at said manifold a minor portion of said entire sample stream as a detection stream;
   e. drawing said detection stream through a He sensor by a second negative pressure device, said He sensor providing a signal upon detection of the presence of trace gas He in said detection stream, and said He sensor and said second negative pressure device being disposed within said mobile enclosure;
   f. converting in near real time said detection signal into quantitative leak rates of said test vessel; and
   g. introducing compressed filtered dry air or inert gas other than He into said sealed enclosure to provide an internal overpressure therein to prevent infiltration into said enclosure interior of hazardous vapors from the location where the enclosure is located and permit the use of of electrical components required for said negative pressure and sensor devices.

12. A method of high speed detection in hazardous environments of He leaks as in claim 11 which includes maintaining said internal overpressure at a selected value relative to the ambient environment in which said enclosure is located to prevent said infiltration of hazardous vapors into said enclosure interior.

13. A method of high speed detection in hazardous environments of He leaks as in claim 12 which includes the step of rapid exchange of said inlet compressed air or inert gas to maintain the internal temperature of said enclosure within a predetermined range and to purge said enclosure of hazardous vapors.

14. A method of high speed detection in hazardous environments of He leaks as in claim 13 which includes the steps of monitoring the temperature in said enclosure, and cooling the interior atmosphere of said enclosure to maintain said internal temperature within a predetermined range.

15. A method of high speed detection in hazardous environments of He leaks as in claim 14 which includes the step of controlling said enclosure internal atmosphere pressure so that where said internal pressure falls below a preselected first, low pressure value, compressed air or inert gas is inlet to the enclosure until the internal enclosure pressure reaches a preselected second, trigger pressure value to initiate a rapid exchange purge sequence to commence for a preselected time period resulting in multiple enclosure gas volume exchanges, during which if the internal enclosure pressure exceeds a preselected, third vent-trigger value, an enclosure protection valve is opened to vent excess gases pressure to the ambient atmosphere in which said enclosure is located, and upon the end of said preselected purge sequence time period, controlling the enclosure internal pressure to a preselected fourth operating value.

16. A method of high speed detection in hazardous environments of He leaks as in claim 15 wherein said step of controlling includes shutting off power to said enclosure when the minimum acceptable pressure is detected, maintaining power off during the rapid exchange sequence, and restoring power at the end of said preselected purge sequence time period.

17. A method of high speed detection in hazardous environments of He leaks as in claim 16 wherein said low first pressure value is selected to be about 0.15" c.w., said second trigger pressure value is selected to be about 2.5" c.w., said third vent-trigger value is selected to be greater than about 0.65" c.w., and said fourth operating value is selected to be on the order of about 1.5" c.w.

18. A method of high speed detection in hazardous environments of He leaks as in claim 14 wherein said internal enclosure temperature is detected by a thermal sensor connected to an external vortex cabinet cooler, actuating internal cooling by use of said compressed air or inert gas provided to said enclosure.

19. A method of high speed detention in hazardous environments of He leaks as in claim 13 wherein said rapid exchange is assisted by a mechanical enclosure valve that vents overpressure from said enclosure interior to the exterior.

20. A method of high speed detection in hazardous environments of He leaks as in claim 11 which includes providing an audible and visual alarm when a predetermined quantitative leak rate is detected.

\* \* \* \* \*